US008442818B2

(12) United States Patent
Trainor

(10) Patent No.: US 8,442,818 B2
(45) Date of Patent: May 14, 2013

(54) APPARATUS AND METHOD FOR ADAPTIVE AUDIO CODING

(75) Inventor: David Trainor, Belfast (GB)

(73) Assignee: Cambridge Silicon Radio Limited, Cambridge (GB)

( * ) Notice: Subject to any disclaimer, the term of this patent is extended or adjusted under 35 U.S.C. 154(b) by 717 days.

(21) Appl. No.: 12/619,029

(22) Filed: Nov. 16, 2009

(65) Prior Publication Data

US 2011/0060594 A1    Mar. 10, 2011

(30) Foreign Application Priority Data

Sep. 9, 2009   (GB) .................................. 0915766.0

(51) Int. Cl.
*G10L 19/02*   (2006.01)
(52) U.S. Cl.
USPC ........................................................ 704/221
(58) Field of Classification Search ........... 704/200–230
See application file for complete search history.

(56) References Cited

U.S. PATENT DOCUMENTS

| 5,341,456 | A | 8/1994 | DeJaco |
| 5,649,052 | A | 7/1997 | Kim |
| 5,978,762 | A | 11/1999 | Smyth et al. |
| 6,134,518 | A | 10/2000 | Cohen et al. |
| 6,600,740 | B1 | 7/2003 | Valentine et al. |
| 7,127,390 | B1 | 10/2006 | Su |
| 7,469,209 | B2 | 12/2008 | Chong-White et al. |
| 7,692,686 | B1 | 4/2010 | Cabot |
| 7,788,090 | B2 * | 8/2010 | Van De Par et al. ....... 704/200.1 |
| 7,970,072 | B2 * | 6/2011 | Oh et al. ........................ 375/265 |
| 8,068,569 | B2 | 11/2011 | Pang et al. |
| 2004/0098251 | A1 | 5/2004 | Vainio et al. |
| 2004/0156453 | A1 * | 8/2004 | Yuan-Wu et al. ............. 375/340 |
| 2007/0270988 | A1 | 11/2007 | Goldstein et al. |

OTHER PUBLICATIONS

European Search Report for patent application 09014291 mailed Mar. 21, 2012, 6 pages.
Van Schijndel, N. H., "Adaptive RD Optimized Hybrid Sound Coding," Jaes Aes, 60 East 42nd Street, Room 2520 New York, 10165-2520, USA, vol. 56 No. 10, Oct. 1, 2008, pp. 787-889, XP04058723.
Quackenbush, S. R., "Coding of natural audio in MPEG-4," Proceedings of the 1998 IEEE International Conference on Acoustics, Speech and Signal Processing, Seattle, WA, May 12-15, 1998, pp. 3797-3800, XP010279596.
Paksoy, E. et al., "An adaptive multi-rate speech coder for digital cellular telephony," 1999 IEEE International Conference on Acoustics, Speech and Signal Processing, Phoenix, AZ, Mar. 15-19, 1999, pp. 193-196, XP000898292.
European Search Report for EP patent application 09014292 mailed Mar. 21, 2012, 7 pages.
Non-Final Office Action mailed Dec. 14, 2011, for U.S. Appl. No. 12/625,764, 18 pages.
Final Office Action for U.S. Appl. No. 12/625,764 mailed Jul. 6, 2012, 13 pages.

* cited by examiner

*Primary Examiner* — Abul Azad
(74) *Attorney, Agent, or Firm* — Withrow & Terranova, PLLC

(57) ABSTRACT

An audio encoder capable of implementing a plurality of encoding functions, wherein an adaptation controller adjusts the implementation of the encoding functions in response to feedback received by the adaptation controller during use. The adjustment may involve adapting encoding algorithms or selecting alternative encoding algorithms. The encoder may also include an operations scheduler to adjust the order in which the encoding functions are applied. The feedback may be received from internally of the encoder, for example from the currently implemented encoding functions, or from externally of the encoder. A corresponding decoder is also provided.

27 Claims, 2 Drawing Sheets

APPARATUS AND METHOD FOR ADAPTIVE AUDIO CODING

This application claims priority to United Kingdom patent application 0915766.0 filed Sep. 9, 2009, the disclosure of which is incorporated herein by reference in its entirety.

FIELD OF THE INVENTION

The present invention relates to the encoding of audio data and the compatible decoding of the encoded audio data after transmission across a communications network. The invention relates particularly to encoding audio using methods that adapt over time based on short-term characteristics of the audio data and the environment external to the audio coding apparatus.

BACKGROUND TO THE INVENTION

Audio coding refers to the transformation of audio data such that the characteristics of the encoded audio data better match the capabilities and constraints of a particular communications network or storage medium. Audio coding is typically coded in order to achieve compression, whereby the representation of audio data is transformed in such a way that the required storage and transmission rate requirements over a network are reduced. Although compression is often the primary goal of audio coding, other characteristics of the audio data, such as the degree of audible degradation caused by audio transmission over an unreliable network, can also be beneficially controlled by coding. An audio codec comprises a mathematical algorithm (although the term "audio codec" may also be used to refer to hardware and/or software embodiments of the algorithm) to apply audio encoding and decoding. Examples of popular audio codecs include MP3, Advanced Audio Coding (AAC) and Free Lossless Audio Codec (FLAC).

Many audio codecs offer options whereby a user can adjust their operation to obtain different performance trade-offs. A common option is the ability to trade off the degree of compression against the computational complexity of the algorithm. At one extreme setting of this option, a codec will expend a huge amount of computational effort in compressing the audio to the fullest extent it can achieve. This results in high compression levels, but also requires more processing time and resources from the computer or embedded device carrying out the audio processing. Depending on the coding approach, the high degree of compression may also increase the degree of audio quality loss attributed to the coding process. Setting the coding option to the opposite extreme yields a very simple and fast coding algorithm, at the expense of reduced levels of audio compression. Some codecs offer other simple options to tailor the operation of the coding algorithms to tune performance measures other than compression levels and computational complexity, although this is a less-common feature.

Although modern audio codecs offer the ability to adapt their operation and hence levels of performance using simple optional settings, there are limitations on this flexibility. Many codec implementations only allow options to be set or changed at the beginning of a particular audio file or data stream and do not provide an intuitive and transparent means to adjust options in real-time, as the data from the audio file or stream is being processed. Whilst the trade-off between levels of compression and computational complexity is well supported by several audio codecs, complex trade-offs between large numbers of relevant performance characteristics are not catered for. The configurable aspects of conventional audio codecs are not self-adapting and self-optimising. Any adaptation or optimisation of the audio coding approach has to be explicitly handled by the designer of the system that contains the audio codec. The system designer must deduce the complex mathematical relationships between real-time changes in the system characteristics and the optimal updated values for the configurable options of the audio codec.

Accordingly, it would be advantageous to provide an audio codec that can autonomously, rapidly and jointly adapt its operation to provide optimal audio coding performance given knowledge of at least one of the short-term characteristics of the audio data, the short-term performance of the system and communications network external to the codec, the capabilities and constraints of the hardware implementing the system and the relative short-term priorities the system places on different measures of audio coding performance. Since the adaptation of the audio coding techniques considers optimisation of a mathematical objective function based on several weighted performance measures, an audio codec that is compliant with this scheme would be carrying out a form of autonomous multidimensional adaptation.

SUMMARY OF THE INVENTION

Accordingly, a first aspect of the invention provides an audio encoder arranged to receive an input comprising samples of audio data and to produce an output comprising encoded audio data, the encoder comprising means for implementing one or more of a plurality of encoding functions, at least one of which is applied in use to said audio data to produce said encoded audio data; and an adaptation controller arranged to control the implementation of said encoding functions in response to one or more feedback inputs received by said adaptation controller during operation of said audio encoder.

Preferably, said adaptation controller is arranged to cause said implementing means to implement, in respect of at least one of said encoding functions, a selected one or more of a plurality of respective encoding algorithms. The selected encoding algorithm(s) may then replace a respective encoding algorithm that is in use by the encoder. It will be understood that each algorithm within the plurality of encoding algorithms is not necessarily a completely different algorithm—it may be a variation, or alternative implementation, of an algorithm. Preferably, said adaptation controller is arranged to cause said implementing means to adapt its implementation, in respect of at least one of said encoding functions, of a selected one or more of a plurality of respective encoding algorithms. This may be achieved by the adaptation controller providing the implementing means with one or more parameter values for controlling the operation of the respective encoding function.

In typical embodiments, the encoder includes, or is associated with (such that it has access to), means for storing a plurality of encoding algorithms (including different implementations of encoding algorithms) that are selectable by said adaptation controller for use in the implementation of said encoding functions. The storage means may take the form of a database or other suitable storage repository.

Advantageously, at least some of said encoding algorithms are stored in association with, or otherwise associated with, respective performance data being indicative of at least one aspect of the performance (including cost) of said encoder should the respective algorithm be selected.

In preferred embodiments, said encoder further includes an operation scheduler arranged to control the order in which the encoding functions (or at least some of them) are applied to said audio data. Advantageously, said operation scheduler is arranged to determine the order in which the encoding functions (or at least some of them) are applied to said audio data in response to instructions received by said operation scheduler from said adaptation controller. Preferably, said adaptation controller is arranged to communicate an operation schedule to said operation scheduler, said operation scheduler causing said encoding functions to be applied in accordance with said operation schedule. Alternatively, the order in which the encoding functions are applied to said audio data is fixed.

Said feedback inputs may include signals received by said adaptation controller from said implementing means in respect of one or more of said encoding functions. In particular, said signals may include data indicative of the status, performance and/or operation of the respective encoding function. In response to receiving such signals, the adaptive controller may be arranged to determine using data included in said signals how the respective encoding function should be adapted, and to cause the respective encoding function to be adapted accordingly. The adaptation caused by the adaptation controller may for example include an adjustment of the algorithm used to implement the encoding function, or replacement of the algorithm used to implement the encoding function with an alternative algorithm.

Said feedback inputs may include signals received by said adaptation controller from said operation scheduler in respect of one or more of said encoding functions, and/or the received audio data and/or other aspects of the operation of the encoder. For example, said adaptation controller may receive information from the operation scheduler regarding the frequency of use of one or more of said encoding functions, e.g. within the overall function schedule used to realise the audio encoder. Such a function activity profile may, for example, be used by the adaptation controller to optimise the encoder for activity-related performance measures such as power consumption. In response to receiving such signals, the adaptive controller may be arranged to determine using data included in said signals how one or more of the encoding functions should be adapted, and to cause the respective encoding functions to be adapted accordingly. The adaptation caused by the adaptation controller may for example include an adjustment of the algorithm used to implement the encoding function, or replacement of the algorithm used to implement the encoding function with an alternative algorithm.

Said feedback inputs may include signals received by said adaptation controller from externally of the encoder. Such signals may for example include information about relevant changes in the performance of the communications network in which the encoder is operating and the system environment. In response to receiving such signals, the adaptive controller may be arranged to determine using data included in said signals how one or more of the encoding functions should be adapted, and to cause the respective encoding functions to be adapted accordingly. The adaptation caused by the adaptation controller may for example include an adjustment of the algorithm used to implement the encoding function, or replacement of the algorithm used to implement the encoding function with an alternative algorithm.

Advantageously, when determining how one or more of the encoding functions should be adapted, said adaptation controller is arranged to evaluate the respective performance data (including cost data as desired) associated with the or each respective selectable encoding algorithm. Similarly, when determining the order in which said encoding functions should be applied to the audio data (e.g. when creating an operation schedule), said adaptation controller is arranged to evaluate the respective performance data (including cost data as desired) associated with the or each respective selected encoding algorithm.

In preferred embodiments, said adaptation controller determines how one or more of said encoding functions is to be adapted by defining an objective function from the respective performance data (including cost data as desired) associated with the respective selected and/or selectable encoding algorithms, and applying a mathematical programming method to obtain an optimum solution to the objective function. Typically, suitable constraints for the objective function are derived from, for example, information regarding one or more of the current network capacity and reliability, the current system processing resources available and priorities and/or limits on performance measures including, but not limited to, coded audio fidelity and audio coding delay.

In preferred embodiments, said performance data (including cost data) may be altered by said adaptation controller in response to information contained in signals received by said adaptation controller from externally of the encoder From a second aspect, the invention provides an audio encoder arranged to receive an input comprising samples of audio data and to produce an output comprising encoded audio data, the encoder comprising means for implementing one or more of a plurality of encoding functions, at least one of which is applied in use to said audio data to produce said encoded audio data, and wherein said encoder further includes an operation scheduler arranged to control the order in which the encoding functions (or at least some of them) are applied to said audio data.

A third aspect of the invention provides an audio decoder for use with the audio encoder of the first aspect of the invention. The decoder is arranged to receive an input comprising encoded audio data and to produce an output comprising decoded audio data, the decoder comprising means for implementing one or more of a plurality of decoding functions, at least one of which is applied in use to said encoded audio data to produce said decoded audio data; and an adaptation controller arranged to control the implementation of said decoding functions in response to one or more feedback inputs received by said adaptation controller during operation of said audio decoder.

Preferably, said adaptation controller is arranged to cause said implementing means to implement, in respect of at least one of said decoding functions, a selected one or more of a plurality of respective decoding algorithms. The selected decoding algorithm(s) may then replace a respective decoding algorithm that is in use by the decoder. It will be understood that each algorithm within the plurality of decoding algorithms is not necessarily a completely different algorithm—it may be a variation, or alternative implementation, of an algorithm.

Preferably, said adaptation controller is arranged to cause said implementing means to adapt its implementation, in respect of at least one of said decoding functions, of a selected one or more of a plurality of respective decoding algorithms. This may be achieved by the adaptation controller providing the implementing means with one or more parameter values for controlling the operation of the respective decoding function.

In typical embodiments, the decoder includes, or is associated with (such that it has access to), means for storing a plurality of decoding algorithms (including different implementations of decoding algorithms) that are selectable by said adaptation controller for use in the implementation of said decoding functions. The storage means may take the form of a database or other suitable storage repository.

Advantageously, at least some of said decoding algorithms are stored in association with, or otherwise associated with, respective performance data being indicative of at least one aspect of the performance (including cost) of said decoder should the respective algorithm be selected.

In preferred embodiments, said decoder further includes an operation scheduler arranged to control the order in which the decoding functions (or at least some of them) are applied to said encoded audio data. Advantageously, said operation scheduler is arranged to determine the order in which the decoding functions (or at least some of them) are applied to said encoded audio data in response to instructions received by said operation scheduler from said adaptation controller. Preferably, said adaptation controller is arranged to communicate an operation schedule to said operation scheduler, said operation scheduler causing said decoding functions to be applied in accordance with said operation schedule. Alternatively, the order in which the decoding functions are applied to said encoded audio data is fixed.

Said feedback inputs may include signals received by said adaptation controller from said implementing means in respect of one or more of said decoding functions. In particular, said signals may include data indicative of the status, performance and/or operation of the respective decoding function. In response to receiving such signals, the adaptive controller may be arranged to determine using data included in said signals how the respective decoding function should be adapted, and to cause the respective decoding function to be adapted accordingly. The adaptation caused by the adaptation controller may for example include an adjustment of the algorithm used to implement the decoding function, or replacement of the algorithm used to implement the decoding function with an alternative algorithm.

Said feedback inputs may include signals received by said adaptation controller from said operation scheduler in respect of one or more of said decoding functions, and/or the received audio data and/or other aspects of the operation of the decoder. For example, said adaptation controller may receive information from the operation scheduler regarding the frequency of use of one or more of said decoding functions, e.g. within the overall function schedule used to realise the audio decoder. Such a function activity profile may, for example, be used by the adaptation controller to optimise the decoder for activity-related performance measures such as power consumption. In response to receiving such signals, the adaptive controller may be arranged to determine using data included in said signals how one or more of the decoding functions should be adapted, and to cause the respective decoding functions to be adapted accordingly. The adaptation caused by the adaptation controller may for example include an adjustment of the algorithm used to implement the decoding function, or replacement of the algorithm used to implement the decoding function with an alternative algorithm.

Said feedback inputs may include signals received by said adaptation controller from externally of the decoder. Such signals may for example include information about relevant changes in the performance of the communications network in which the decoder is operating and the system environment. In response to receiving such signals, the adaptive controller may be arranged to determine using data included in said signals how one or more of the decoding functions should be adapted, and to cause the respective decoding functions to be adapted accordingly. The adaptation caused by the adaptation controller may for example include an adjustment of the algorithm used to implement the decoding function, or replacement of the algorithm used to implement the decoding function with an alternative algorithm.

Advantageously, when determining how one or more of the decoding functions should be adapted, said adaptation controller is arranged to evaluate the respective performance data (including cost data as desired) associated with the or each respective selectable decoding algorithm. Similarly, when determining the order in which said decoding functions should be applied to the encoded audio data (e.g. when creating an operation schedule), said adaptation controller is arranged to evaluate the respective performance data (including cost data as desired) associated with the or each respective selected decoding algorithm.

In preferred embodiments, said adaptation controller determines how one or more of said decoding functions is to be adapted by defining an objective function from the respective performance data (including cost data as desired) associated with the respective selected and/or selectable decoding algorithms, and applying a mathematical programming method to obtain an optimum solution to the objective function. Typically, suitable constraints for the objective function are derived from, for example, information regarding one or more of the current network capacity and reliability, the current system processing resources available and priorities and/or limits on performance measures including, but not limited to, coded audio fidelity and audio coding delay.

In preferred embodiments, said performance data (including cost data) may be altered by said adaptation controller in response to information contained in signals received by said adaptation controller from externally of the decoder From a fourth aspect, the invention provides an audio decoder arranged to receive an input comprising encoded audio data and to produce an output comprising decoded audio data, the decoder comprising means for implementing one or more of a plurality of decoding functions, at least one of which is applied in use to said encoded audio data to produce said decoded audio data, and wherein said decoder further includes an operation scheduler arranged to control the order in which the decoding functions (or at least some of them) are applied to said encoded audio data.

A fifth aspect of the invention provides an audio codec comprising the audio encoder and/or the audio decoder of the first and third aspects of the invention.

In some embodiments, the encoder acts as a master and the decoder acts as a slave, whereby the encoder causes data indicating one or more aspects of the configuration of the encoder to be communicated to the decoder, whereupon the decoder adapts its own configuration in accordance with the configuration data received from the encoder. Conveniently, the adaptation controller of the encoder causes said configuration data to be communicated to the decoder. Conveniently, the adaptation controller of the decoder causes the configuration of the decoder to be adapted in accordance with the configuration data received from the encoder.

In alternative embodiments, the decoder acts as a master and the encoder acts as a slave, whereby the decoder causes data indicating one or more aspects of the configuration of the decoder to be communicated to the encoder, whereupon the encoder adapts its own configuration in accordance with the configuration data received from the decoder. Conveniently, the adaptation controller of the decoder causes said configuration data to be communicated to the encoder. Conveniently, the adaptation controller of the encoder causes the configuration of the encoder to be adapted in accordance with the configuration data received from the decoder.

Said configuration data may be communicated between the encoder and the decoder by any suitable means. For example, said configuration data may be incorporated into the encoded audio data sent from the encoder to the decoder (sometimes referred to as overhead data). Alternatively, or in addition, said configuration data may be sent between the encoder and the decoder by a separate communication channel.

In cases where the decoder is the master, it is preferred that the decoder, and in particular the adaptation controller, is arranged to communicate said configuration data to the encoder prior to causing the respective components of the decoder to conform to said configuration data, the encoder, and in particular its adaptation controller, being arranged to inform the decoder when the encoder has conformed to the configuration data, and wherein, upon being so informed, the decoder is caused to conform to said configuration data.

A sixth aspect of the invention provides a method of audio encoding, the method comprising receiving an input comprising samples of audio data, implementing one or more of a plurality of encoding functions, applying at least one of said encoding functions to said audio data to produce encoded audio data; and controlling the implementation of said encoding functions in response to one or more feedback inputs received by said adaptation controller during operation of said audio encoder.

A seventh aspect of the invention provides a method of audio encoding, the method comprising receiving an input comprising samples of audio data, implementing one or more of a plurality of encoding functions, applying at least one of said encoding functions to said audio data to produce encoded audio data; and controlling the order in which the encoding functions (or at least some of them) are applied to said audio data.

An eighth aspect of the invention provides a method of audio decoding, the method comprising receiving an input comprising samples of encoded audio data, implementing one or more of a plurality of decoding functions, applying at least one of said decoding functions to said encoded audio data to produce decoded audio data; and controlling the implementation of said decoding functions in response to one or more feedback inputs received by said adaptation controller during operation of said audio decoder.

An ninth aspect of the invention provides a method of audio decoding, the method comprising receiving an input comprising samples of encoded audio data, implementing one or more of a plurality of decoding functions, applying at least one of said decoding functions to said encoded audio data to produce decoded audio data; and controlling the order in which the decoding functions (or at least some of them) are applied to said encoded audio data.

A further aspect of the invention provides an audio encoder comprising an input for receiving samples of audio data; an output for encoded audio data; means for implementing a plurality of encoding functions; means for causing at least one of said encoding functions to be applied in use to said audio data samples to produce said encoded audio data, wherein said means for causing at least one of said encoding functions to be applied to said audio data samples comprises an operation scheduler arranged to control the order in which at least some of the encoding functions are applied to said audio data samples.

Another aspect of the invention provides an audio decoder comprising an input for receiving samples of encoded audio data; an output for decoded audio data; means for implementing a plurality of decoding functions; means for causing at least one of said decoding functions to be applied in use to said encoded audio data samples to produce said decoded audio data, wherein said means for causing at least one of said decoding functions to be applied to said encoded audio data samples comprises an operation scheduler arranged to control the order in which at least some of the decoding functions are applied to said encoded audio data samples.

Preferably, said operation scheduler is arranged to implement an operation schedule that indicates the order in which said at least some of the encoding functions are applied to said audio data samples, and to cause said at least some of the encoding functions to be applied to said audio data samples in accordance with said operation schedule.

Preferably, said operation scheduler is responsive to at least one characteristic of at least one of said encoding functions to cause the order in which at least some of the encoding functions are applied to said audio data samples to be changed.

Advantageously, said at least one characteristic of at least one of said encoding functions includes the respective frequency of use of the respective encoding function.

Preferably, said operation scheduler is responsive to at least one characteristic of the audio data samples to cause the order in which at least some of the encoding functions are applied to said audio data samples to be changed.

Advantageously, the encoder is responsive to at least one feedback input to provide said operation scheduler with a new operation schedule.

Optionally, said at least one feedback input includes signals from said implementing means in respect of one or more of said encoding functions.

Said at least one feedback input may include signals from said operation scheduler in respect of one or more aspects of the operation of the encoder, and/or in respect of one or more characteristics of the input samples received by the encoder in use.

Preferably, said at least one feedback input includes signals received from externally of the encoder.

In preferred embodiments, the encoder is arranged to receive data from a decoder, said data being indicative of the configuration of the decoder, and wherein said encoder is arranged to cause the order in which at least some of the encoding functions are applied to said audio data samples to be adjusted in accordance with the configuration data received from the decoder.

The preferred decoder is arranged to receive data from an encoder, said data being indicative of the configuration of the encoder, and wherein said decoder is arranged to cause the order in which at least some of the decoding functions are applied to said encoded audio data samples to be adjusted in accordance with the configuration data received from the encoder.

The decoder may be arranged to send data to an encoder, said data being indicative of the configuration of the decoder, and to receive an acknowledgement from the encoder, and wherein said decoder is arranged to delay said adjusting of the order in which at least some of the decoding functions are applied to said encoded audio data samples until said acknowledgement is received.

Further aspects of the invention provide, respectively, a computer program product comprising computer usable code stored on a computer usable medium for causing a computer to implement a respective one of the methods of the sixth to ninth aspects of the invention.

Preferred features of the invention are recited in the dependent claims. Claimed features of the encoder are also applicable to the decoder in the context of decoding rather than encoding, as will be apparent to a skilled person upon review of the following description of a preferred embodiment.

Preferred embodiments of the invention allow adaptation of the audio coding operation to optimise several performance criteria, making the adaptation process a multidimensional optimisation problem.

Further advantageous aspects of the invention will be apparent to a skilled person upon review of the following description of preferred embodiments and with reference to the accompanying description.

BRIEF DESCRIPTION OF THE DRAWINGS

An embodiment of the invention is now described by way of example and with reference to the accompanying drawings in which.

DETAILED DESCRIPTION

Figure 1:
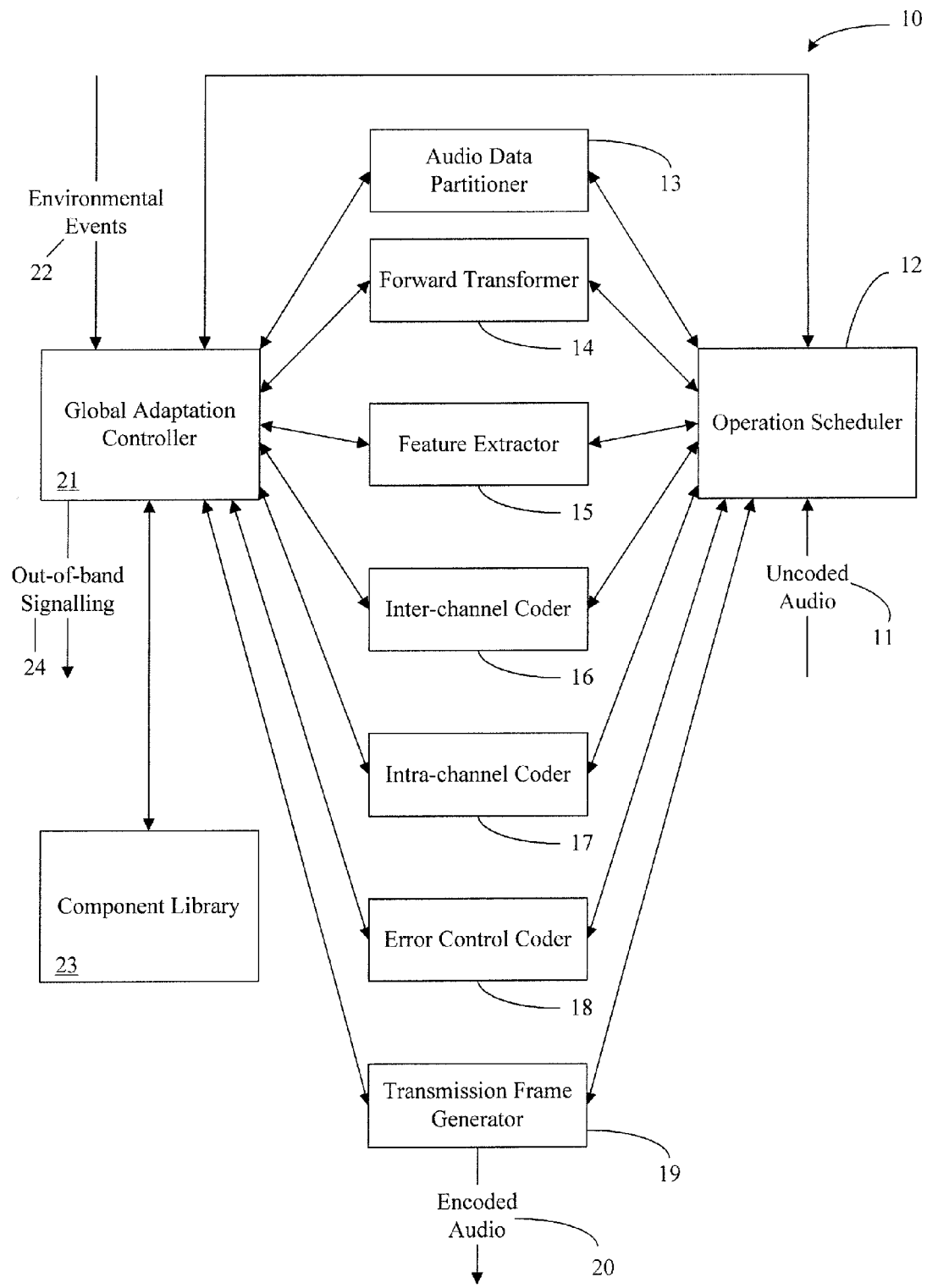
FIG. 1 is a block diagram of an audio encoder suitable for use with the present invention.
Figure 2:
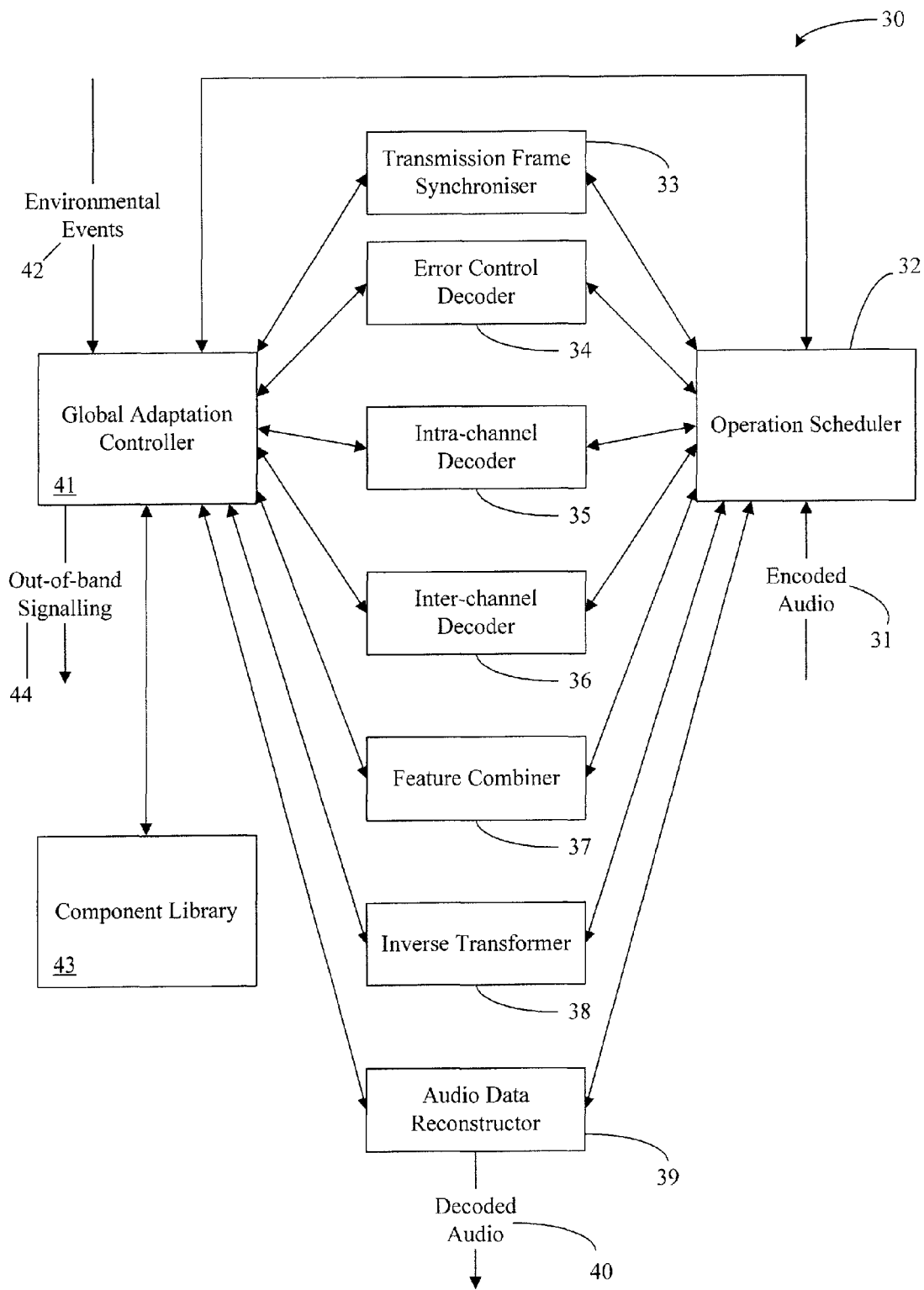
FIG. 2 is a block diagram of an audio decoder suitable for use with the encoder of FIG. 1 to provide an audio codec.

Referring now to FIGS. 1 and 2 of the drawings, there is shown an audio codec comprising an audio encoder 10 and an audio decoder 30, the codec, the encoder and the decoder each embodying respective aspects of the present invention. In use, the encoder 10 receives an input signal containing samples of uncoded audio data 11, which digitally capture audio information in the time domain. The encoder 10 processes the input signal to produce collections of samples, or frames, of encoded audio data 20. The processing performed by the encoder 10 codes the audio data into a transformed representation such that it may be communicated to a peer decoder 30 in a particularly efficient manner, given the performance and constraints of the underlying system hardware and the communications network. The decoder 30 receives the frames of encoded audio 31 and decodes them to produce an output signal 40 comprising either an exact or an approximate reconstruction of the stream of audio samples input to the encoder 10. The encoder 10 and decoder 30 communicate using any suitable communication means, which may include a wireless and/or wired communications links, typically by means of one or more communications networks (not illustrated). Hence, the encoder 10 may be co-operable with a communications transmitter (not illustrated) for transmitting the coded audio frames to the decoder 30, and the decoder 30 may be co-operable with a communications receiver (not shown) for receiving the coded audio frames. The transmitter and receiver each process the coded audio frames in accordance with the underlying communications technologies and protocols that they are configured to support.

Referring in particular to FIG. 1, the encoder 10 is arranged to receive an input sample stream of uncoded audio 11. These audio samples are initially produced by and received from an audio streaming device (not shown) at an arbitrary sample rate and sample precision, as captured in the number of bits used to represent each sample. The samples may also be captured from an arbitrary number of related audio channels, for example left and right channels for stereo audio or the front left, front right, centre, back left, back right and low-frequency effects channels in a typical 5.1 surround sound system. The audio samples to be encoded are supplied as input data to an Operation Scheduler 12. The Operation Scheduler is responsible for dispatching data to, and receiving processed data from, a plurality of signal processing units for performing encoding functions on the audio samples. In preferred embodiments, the units comprise one or more of an Audio Data Partitioner 13, a Forward Transformer 14, a Feature Extractor 15, an Inter-channel Coder 16, an Intra-Channel Coder 17, an Error Control Coder 18 and a Transmission Frame Generator 19, all of which may be implemented by computer software, dedicated hardware or a combination of software and hardware. Throughout the remainder of this description, the term "encoding units" will be used to generally refer to the collection of encoding functions labelled 13 to 19 on FIG. 1. The Operation Scheduler 12 includes means for holding information about the order, or schedule, in which the encoder units are to be applied to the audio samples, and preferably also information about the meaning and purpose of the data supplied to and received from the different encoding units. The schedule held by the Operation Scheduler 12 can itself be modified and/or updated based on adaptation directives created by an exchange of information between the Operation Scheduler 12 and, in preferred embodiments, a Global Adaptation Controller 21 or any other convenient means. By adapting the operation schedule, different types of audio encoding algorithms can be dynamically created by applying the operations of the encoding units in different orders and processing different sets of data. Hence, the Operation Scheduler 12 provides means for causing the relevant encoding functions to be applied to the audio samples. Typically, having established the order in which the encoding units are to be applied, the Operation Scheduler 12 sends the audio data samples to the first encoding unit then, having received processed data back from the first encoding unit, sends the processed data to the next encoding unit identified by the schedule, and so on until all of the relevant encoding units have been applied. In some embodiments, the Operations Scheduler 12 may be omitted in which case any other suitable means for causing the relevant encoding functions to be applied to the audio samples may be provided. For example, the relevant encoding functions and the order in they are applied may be fixed and so be inherent to the configuration of the encoder.

The Operation Scheduler 12 and Global Adaptation Controller 21 may for example each be physically realised as software executing on a processor, or as configuration data used to program a programmable hardware device such as a Field Programmable Gate Array, or dedicated hardware such as a bespoke integrated circuit.

In the preferred embodiment, there are seven specialised encoding units. The Audio Data Partitioner 13 is a unit arranged to gather collections of audio samples into optimally-sized blocks for subsequent processing by other encoding units. The optimum block size is a variable that depends on the type of audio data being encoded and also is dynamically adaptable under the direction of the Global Adaptation Controller 21. The Forward Transformer 14 is a unit capable of applying mathematical and/or signal-processing transformations to input data. Examples of such transformations include, but are not limited to, Discrete Fourier Transforms and Discrete Wavelet Transforms. The Feature Extractor 15 is a unit capable of identifying and separating out one or more particular features in blocks of audio data. Depending on the particular types of feature(s) to be detected or measured by the Feature Extractor 15, the audio data may require pre-processing, using the functionality of one or more of the other encoding units, before feature extraction can be applied. Examples of features that may be detected or measured include, but are not limited to, fast time-domain transients, classification of speech material as voice or unvoiced, masking information derived from comparison of processed audio data with psychoacoustic models, audio source separation, audio source identification and spatial features extracted from multi-channel audio signals. The Inter-channel Coder 16 is a unit that compresses multi-channel audio by exploiting redundancies and similarities between the audio signals in each channel within an appropriately-sized window of samples. Examples of techniques that may be employed by the Inter-channel coder 16 include, but are not limited to, mid-side coding for stereo audio signals and the encoding of surround sound signals using downmixed audio data and separate low-rate spatial parameters. The Intra-channel Coder 17 is a unit that compresses a single channel of audio by exploiting signal redundancy within blocks of successive samples associated with that particular channel. Examples of techniques that may be employed by the Intra-channel encoder 17 include, but are not limited to, linear predictive coding, run-length coding and entropy coding. Each of the Inter-channel Coder 16 and Intra-channel Coder 17 may also be capable of compressing audio in a lossy fashion by application of techniques including, but not limited to, sample rate conversion and quantisation. Application of lossy compression techniques on an audio channel results in an approximation of the audio signal for that channel being recovered by the peer decoder 30, rather than a replica of the signal. The Error Control Coder 18 is a unit that can encode data to allow peer functionality in the decoder 30 to carry out error detection, correction and concealment to prescribed levels, thereby increasing the robustness of the audio codec to data errors introduced by unreliable reception of data from the communications network. Examples of suitable error control techniques include, but are not limited to, cyclic redundancy checks, convolutional error-correcting codes, algebraic error-correcting codes, iterative (turbo) error-correcting codes and the synthesis of lost audio data via time-domain interpolation or spectral shaping of a wideband noise signal. The Transmission Frame Generator 19 is a unit that collates all the sets of encoded data required for the decoder to recover a prescribed amount of audio data, adds additional framing information, and reformats that data into a form compatible for transmission over the particular communications network. Examples of additional framing information that can be inserted for detection by peer functionality in the decoder 30 include, but are not limited to, frame synchronisation preambles, audio metadata, non-audio auxiliary data and frame padding data. Encoded Audio 20 is produced in frames by the Transmission Frame Generator 19 and supplied to a communications transmitter to be sent over the communications network.

The respective technique(s) employed by each of the encoding units 13 to 19 in implementing the functionality described above may be conventional. Advantageously, one or more of the encoding units 13 to 19 is configured to support more than one respective data processing technique, or function, the or each respective technique that is actually used being selectable by the Global Adaptation Controller 21. Hence, the specific signal-processing algorithm performed by the encoder 10 as a whole, and the corresponding respective algorithm implementation used within each (or at least some) of the encoding units can be independently and dynamically adapted or switched in real-time under adaptation directives created by an exchange of information between the encoding units and the Global Adaptation Controller 21. Hence audio encoding algorithms with a wide variety of performance characteristics can be dynamically created by adapting or completely switching the specific algorithm and algorithm implementation used to realise each of the encoding units.

The encoder 10 further includes, or at least has access to, a Component Library 23, which is a repository, or database, of signal-processing algorithm implementations, from which a respective implementation can be drawn to implement the algorithm associated with any encoding unit at any given time. Any encoding unit algorithm to be implemented must typically has at least one compatible signal-processing algorithm implementation stored in the Component Library 23. The different selectable algorithm implementations can be stored in the Component Library 23 in forms including, but not limited to, compiled software routines, programming information files for Field Programmable Gate Arrays and textual source code in a particular programming language (as required depending on how the encoder 10 is implemented).

For example, the encoder 10 as shown in FIG. 1 may be regarded as a logical or functional view of the encoder 10. If, by way of example, it is desired that the encoder adopts a form that does all or part of its processing in the frequency domain rather than the time domain, then the conceptual Forward Transformer unit 14 must be physically realised in a form that can implement a Discrete Fourier Transform. Within the Component Library 23, which may take the form of a database, there is one or more implementation of a Discrete Fourier Transform. The implementation(s) is in the form of software if the encoder is being implemented as software on a processor. The implementation(s) could alternatively be a programming or configuration file for an FPGA, or the like, if the encoder is being implemented on programmable hardware.

In addition to the implementation itself, each algorithm implementation stored in the Component Library 23 advantageously has an accompanying set of data, which may be regarded as metadata, that indicates the achievable performance of the encoder 10, typically in terms of metrics and/or cost of implementation, for that particular algorithm implementation, given knowledge of the communications network and the system hardware upon which the audio codec is executing. Examples of relevant algorithm implementation performance metrics include, but are not limited to, numerical accuracy, numerical stability, level of audio compression achieved and level of error detection or correction added. Examples of relevant algorithm implementation costs include, but are not limited to, the number of execution cycles required on a particular microprocessor, the processing delay of the algorithm and the degree of audio distortion introduced by application of the particular algorithm.

The preferred dynamic adaptation of the audio encoder is carried out using one or more of three principal methods. The first method is by adjusting one or more numerical control parameters that tune the operation of a particular signal-processing algorithm implementation that has currently been selected to implement the algorithm of a particular encoding unit. The second method is to replace the algorithm and/or the algorithm implementation used to realise one or more encoding units. This allows the encoding units, and hence the complete audio encoder, to operate at different performance levels and implementation costs. The third method is to change the order of the operations and the flow of data throughout the encoding units by adjusting the operation schedule held within the Operation Scheduler 12. The three audio encoder adaptation methods can be applied individually or in any combination.

In order to adapt the audio encoder 10 in a way that improves audio coding performance, one or both of two preferred mechanisms may be employed to decide what elements of the encoder should be adapted and in what specific ways. The first mechanism is autonomous data-directed adaptation within some algorithm implementations that can be selected by the Global Adaptation Controller 21 in order to implement the functionality in one or more of the encoding units for a length of time. Compliant algorithm implementations have the ability to adapt and optimise their operation without external direction by internally calculating statistics directly from the processed audio data that they are supplied with and adjusting their operation accordingly. Examples of input data statistics that can be used by such algorithm implementations to perform autonomous adaptation include, but are not limited to, the range of data values, the variance of data values and the mean of data values. Examples of algorithms that can be used to implement all or part of an encoding unit and utilise this form of autonomous data-directed adaptation include, but are not limited to, intra-channel encoding using Rice coding with dynamic Rice parameter and intra-channel encoding using differential coding with data-directed adaptive prediction filters.

In contrast with the first mechanism of calculating how to adapt the audio encoder, in which individual encoding units adapt in an internal and autonomous fashion, the second mechanism is distributed in nature and involves cooperation between the Global Adaptation Controller 21, the encoding units 13 to 19, the Operation Scheduler 12 and the Component Library 23, as applicable. This second mechanism is designed to calculate how classes of encoder adaptation should be carried out at any given time when such decisions require data or status information from many different functional units within the encoder. The Global Adaptation Controller 21 is able to query relevant status from the encoding units and the Operation Scheduler 12 and read the performance and cost metadata for the algorithm implementations held in the Component Library 23. It can also receive external input signals, labelled Environmental Events 22 in FIG. 1, that carry information about relevant changes in the performance of the communications network and the system environment. Examples of such relevant events include, but are not limited to, fluctuations in the short-term capacity of the communications network (which may require adaptation of audio compression levels), fluctuations in the reliability of the communications network (which may require adaptation of the error control algorithm or algorithm implementation employed by the audio encoder) and a change in the amount or type of system processing resources e.g. microprocessor clock cycles that can be dedicated to audio encoding tasks (which may require adaptation of the encoder algorithm implementations to better match the available processing resources). Note that the input signals arriving via Environmental Events 22 may cause the Global Adaptation Controller 21 to issue directives to the Component Library 23 to update the performance and cost metadata for the algorithm implementations it contains. This is carried out because the performance and cost associated with a particular algorithm implementation may change as environmental conditions change. Once the Global Adaptation Controller 21 has access to up-to-date algorithm performance and cost metadata from the Component Library 23 and has gathered all necessary input signals and status information from other parts of the encoder, it can calculate the optimum set of updated adaptation directives to be communicated to the encoding units, the Operation Scheduler 12 and/or the Component Library 23, as applicable, which adapt their respective operation and/or status accordingly. An optimum set of directives may be found from the optimum solution to a mathematical programming problem, where a suitable objective function is derived from the algorithm implementation performance and cost metadata and suitable constraints are derived from the supplied information regarding the current network capacity and reliability, the current system processing resources available and priorities and/or limits on performance measures including, but not limited to, coded audio fidelity and audio coding delay. Note that the performance measure priorities and limits may be fixed at preconfigured values within the Global Adaptation Controller 21 or can be dynamically adjusted by appropriate signalling through the input interface Environmental Events 22. Examples of the type of mathematical programming problem that the Global Adaptation Controller 21 has to solve to in order to determine the optimum set of updated adaptation directives include, but are not limited to, gradient descent, linear programming and integer programming.

As an example, consider the use of linear programming to derive an objective function to be minimised under a set of derived constraints. Assume that the three coding performance measurements of computational complexity, compressed bit rate and coding delay are to be jointly optimised in this example. Hence the form of the objective function is $F(x_1, x_2, x_3)=c_1x_1+c_2x_2+c_3x_3$, where $x_1$, $x_2$ and $x_3$ are variables representing the cost, in terms of computational complexity, bit-rate and delay respectively, of creating an audio codec using a particular operation schedule and particular algorithm implementations to carry out the required functionality of the encoding units. Examples of relevant ways of measuring cost include processor cycles for computational complexity cost, average kilobits per second for bit-rate cost and milliseconds for coding delay cost. The positive weights c1, c2 and c3 represent relative prioritisations between the three performance parameters, with a larger weight indicating a higher priority. Note that prioritisation, and hence the derived value of the weights, can be adapted in response to signalling received via Environmental Events 22. The objective function is a linear function in this example and the optimisation process should find the choice of schedule and algorithm implementations that corresponds to a minimal value of F. However, this minimisation must respect a set of linear constraints. A set of simple constraints that could be used for the example under consideration are $x_1<A$, $x_2<B$ and $x_3<C$, where A, B and C are the maximum acceptable cost for computational complexity, bit-rate and coding delay respectively. These expressions constrain the minimisation of F. For example, if bit-rate is highly prioritised, by selecting a very large value for the weight $c_2$, the system can reduce the value of F by selecting strategies that compress the audio more aggressively. However, such strategies typically incur higher costs in terms of complexity and/or delay and the constraints on acceptable complexity and delay will typically limit how far this approach can be taken. Once the objective function has been minimised, subject to the constraints, the Global Adaptation Controller 21 analyses the choices that generate the optimal objective function value and issues appropriate adaptation directives to the encoding units, the Operation Scheduler 12 and the Component Library 23.

Referring in particular to FIG. 2, the decoder 30 is now described. It will be apparent that the decoder is conceptually similar to the encoder in that in includes an operation scheduler, a global adaptation controller, a plurality of configurable decoding units and a component library. Accordingly, similar descriptions apply to the decoder as have been made in relation to the encoder 10, as would be understood by a skilled person. The decoder 30 receives a stream of encoded data frames via the input labelled encoded audio 31. This input signal is directed to an Operation Scheduler 32, which operates in a similar fashion to the encoder Operation Scheduler 12 in FIG. 1 and in respect of which similar descriptions apply. However, the decoder Operation Scheduler 32 may be wholly or partially constrained to follow an operation schedule that is compatible with the operation schedule of the peer encoder 10. The respective operation schedules of the encoder 10 and decoder 30 must be such that the audio data can be successfully decoded by the decoder 30. The decoder 30 can learn about the operation schedule chosen by the encoder 10 at any given time by either of two convenient methods. The first method is in-band, where control information regarding the encoder 10 operation schedule is placed within the transmitted audio frames themselves and can be recovered by the decoder 30. The second method is out-of-band, where information regarding changes in the encoder 10 operation schedule are transmitted to the decoder 30 via a communications channel on the network this is logically separate from the communications channel used to convey the coded audio data. It is also possible to send this out-of-band control information to the decoder 30 over an entirely different communications network that is physically separate from the network carrying the coded audio data. The out-of-band control information may be generated by the encoder 10 through the output of the Global Adaptation Controller 21 labelled Out-of-band Signalling 24 in FIG. 1. After transmission across the relevant communications network, the out-of-band control information can be input to the decoder 30 through the decoder interface labelled Environmental Events 42 in FIG. 2 and the decoder Operation Scheduler 32 can be adapted via directives from the decoder Global Adaptation Controller 41.

In a similar fashion to the encoder 10, the decoder Operation Scheduler 32 is responsible for dispatching data to, and receiving processed data from, a plurality of signal processing units for performing decoding functions on the encoded audio samples. In preferred embodiments, the units comprise one or more of a Transmission Frame Synchroniser 33, an Error Control Decoder 34, an Intra-channel Decoder 35, an Inter-channel Decoder 36, a Feature Combiner 37, an Inverse Transformer 38 and an Audio Data Reconstructor 39, all of which may be implemented by computer software, dedicated hardware or a combination of software or hardware. Throughout the remainder of this description, the term "decoding units" will be used to generally refer to the collection of decoding functions labelled 33 to 39 on FIG. 2. The Transmission Frame Synchroniser 33 is a unit responsible for delimiting encoded audio frames from the stream of raw data received from the communications receiver. Frame boundary identification can be assisted using synchronisation information inserted into the coded audio frames by the operation of the peer audio encoder 10. The Transmission Frame Synchroniser 33 is also responsible for parsing the received frames and formatting the various data fields within each frame. The Error Control Decoder 34 is a unit responsible for decoding and acting upon the error control data inserted by the peer encoder 10 via the Error Control Coder 18 shown in FIG. 1. Hence the Error Control Decoder 34 implements strategies to detect, correct and conceal errors and data loss within the received coded audio stream. The Intra-channel Decoder 35 is a unit that can decode or invert the coding operations performed independently on each audio channel by the peer encoder 10 via the Intra-channel Encoder 17 shown in FIG. 1. The Inter-channel Decoder 36 is a unit that can decode or invert the coding operations performed across related groups of audio channels by the peer encoder 10 via the Inter-channel Encoder 16 shown in FIG. 1. The Feature Combiner 37 is a unit that can mathematically recombine any individual audio features separated out of the audio signal for independent encoding by the peer encoder 10 via the Feature Extractor 15 shown in FIG. 1. The Inverse Transformer 38 is a unit that can invert the data transformations applied by the peer encoder 10 via the Forward Transformer 14 shown in FIG. 1. The transform inversion process converts all relevant audio data back into the time-domain from one or more transformed domains. The Audio Data Reconstructor 39 is a unit that performs any final signal processing to reconstruct the block of audio samples originally encoded by the peer encoder 10. Examples of signal processing that the Audio Data Reconstructor 39 may have to implement include, but are not limited to, simple summation and fixed-point limiting of a number of input signals, audio equalisation and audio sampling rate conversion. The Audio Data Reconstructor 39 outputs blocks of decoded audio, labelled Decoded Audio 40 in FIG. 2. The respective technique(s) employed by each of the encoding units 33 to 39 in implementing the functionality described above may be conventional. Advantageously, one or more of the encoding units 33 to 39 is configured to support more than one respective data processing technique, or function, the or each respective technique that is actually used being selectable by the Global Adaptation Controller 41 or otherwise determined by the techniques (algorithms) employed by the corresponding units of the encoder 10.

The Operation Scheduler 32 provides means for causing the relevant decoding functions to be applied to the encoded audio samples. In some embodiments, the Operations Scheduler 32 may be omitted in which case any other suitable means for causing the relevant decoding functions to be applied to the encoded audio samples may be provided. For example, the relevant decoding functions and the order in they are applied may be fixed and so be inherent to the configuration of the decoder.

The Operation Scheduler 32 and Global Adaptation Controller 41 may for example each be physically realised as software executing on a processor, or as configuration data used to program a programmable hardware device such as a Field Programmable Gate Array, or dedicated hardware such as a bespoke integrated circuit.

In a manner similar to that described for the encoder, the decoder supports autonomous data-directed adaptation capabilities of the algorithms implementing the decoding units, combined with the interactions between the decoder Operation Scheduler 32, the Global Adaptation Controller 41, the Component Library 43 and/or the Environmental Events 42 (as applicable), for controlling the calculation and distribution of decoder adaptation directives in a manner analogous to that of the encoder 10. However, the multidimensional optimisation problem that the decoder Global Adaptation Controller 41 must solve in order to calculate updated optimal adaptation directives will have additional constraints caused by the necessity to select algorithm implementations that are compatible with the peer algorithms chosen by the encoder 10. The decoder 30 can learn about the adaptation directives chosen by the encoder 10 at any given time via any combination of in-band and out-of-band signalling from the encoder 10 to the decoder 30, as described earlier in the context of communicating the encoder operation schedule choices. Hence, the decoder 30 can only optimise its adaptation directives to improve its performance in ways that do not break functional compatibility with the freely-chosen adaptations carried out on the peer encoder 10. In this sense, for some or all of the possible means of adaptation, the encoder 10 can be considered a master and the decoder 30 a slave, in that decoder adaptation is either wholly or partially constrained based on encoder adaptation.

In an alternative embodiment of the invention, the adaptation master and slave relationship between the audio encoder 10 and decoder 30 can be reversed. This is particularly advantageous for applications where decoder constraints and lower bounds on decoder performance measures are much more stringent than those on the encoder 10. An example of such an application would be encoded audio streaming from a personal computer, over a wireless network, and received by an embedded audio device such as a portable media player. The limitations of the receiving system are much more profound than those of the transmitting system. Hence, it would be advantageous to allow the audio decoder 30 maximal freedom to adapt its operation and wholly or partially constrain the audio encoder adaptation to remain functionally compatible with the decoder 30. Alternative embodiments of the invention may allow this to occur as follows. The decoder 30 is allowed to derive its updated adaptation directives without constraint from the encoder 10. Referring to FIG. 2, the decoder Global Adaptation Controller 41 stores the updated adaptation directives but does not yet communicate the directives throughout the decoder 30 to effect the adaptation. Instead, the decoder Global Adaptation Controller 41 sends information on its updated adaptation directives to the output labelled Out-of-band Signalling 44 in FIG. 2, which in turn transmits the information to the system containing the audio encoder 10 via a suitable communications channel. The information is input to the audio encoder 10 via the input Environmental Events 22 in FIG. 1 and hence the encoder 10 can be compelled to adapt its operation in a way compliant with the freely-chosen adaptation directives calculated by the decoder 30. The encoder 10 can indicate to the decoder 30, via in-band control information placed within the coded audio frames, that the encoder 10 has now adapted in a way compliant with the updated decoder adaptations that have just been calculated, but not yet applied, by the decoder 30. Once the decoder 30 receives this indication, the updated decoder adaptation directives that were stored by the decoder Global Adaptation Controller 41 are distributed throughout the decoder 30 to effect the new adaptations, simultaneously optimising the decoder performance and maintaining functional compatibility between the encoder 10 and decoder 30.

In such alternative embodiments of the invention, a communications channel allowing transmission of control information from the system containing the audio decoder 30 to the system containing the audio encoder 10 is required. This communications channel could be a completely separate network from the in-band network carrying coded audio from the encoder 10 to decoder 30. Equally, a single network with duplex communication capability could be used to convey both coded audio from the encoder 10 to the decoder 30 and control information from the decoder 30 back to the encoder 10. In such alternative embodiments of the invention, the frequency with which new audio decoder adaptations may be carried out is limited by the time taken for the audio decoder 30 to communicate its updated adaptation directives back to the audio encoder 10 and the audio encoder 10 to communicate its compliant adaptation via in-band signalling to the audio decoder 30.

In alternative embodiments, the or each scheduler 12, 32 may be arranged to operate with a fixed operations schedule (as opposed to the variable schedule described above). This reduces the flexibility of the encoder/decoder, but reduces its complexity. In such cases, the operation scheduler 12, 32 need not be considered as a separate entity of the encoder/decoder (and may be regarded as having been omitted) since the schedule by which the encoding/decoding units are implemented is inherent to the encoder/decoder. The number, type and order of operations in the audio codec would become fixed, but the Global Adaptation Controller 21, 41 would advantageously still be able to pick different algorithm implementations from the Component Library 23, 43 to realise those functions in a manner best suited to the current conditions.

In alternative embodiments, one or more of the encoding and/or decoding units may be omitted. For example, the Feature Extraction unit could be omitted, resulting in a simpler codec but less-efficient coding. The Error Control units could be omitted for applications that already have efficient error control built into the underlying network communications protocols. The Transformer unit could be omitted, resulting in a simpler (time-domain only) codec but less-efficient coding.

In alternative embodiments, the scope of the Global Adaptation Controller 21, 42 may be reduced, e.g. optimise over a smaller set of performance measurements, limit or disable the Environmental Events input, and so on.

In alternative embodiments, where a duplex communications channel, or other communications means, allowing transmission of data, especially control information, between the encoder and decoder is present, the encoder Global Adaptation Controller 21 may be implemented on the device, or system, by which the decoder 30 is implemented. This involves the transmission of the status of the encoder 10 to the decoder 30 and the corresponding adaptation directives from the decoder 30 back to the encoder 10 using the communications channel. In such embodiments, the encoder Global Adaptation Controller 21 is still functionally part of the encoder, even though it is physically implemented elsewhere. In this connection, the encoder Global Adaptation Controller 21 could alternatively be implemented by a resource other than those that implement the encoder and the decoder.

Alternatively still, where a duplex communications channel, or other communication means, allowing transmission of data, especially control information, between the encoder and decoder is present, the decoder Global Adaptation Controller 41 may be implemented by the device, or system, responsible for executing the encoder 10. This involves the transmission of the status of the decoder 30 to the encoder 10 and the corresponding adaptation directives from the encoder 10 back to the decoder 30 using the communications channel. In such embodiments, the decoder Global Adaptation Controller 41 is still functionally part of the decoder, even though it is physically implemented elsewhere. In this connection, the decoder Global Adaptation Controller 41 could alternatively be implemented by a resource other than those that implement the encoder and the decoder.

It is noted that the features of the alternative embodiments described above could be made individually or in combination with one another.

The invention claimed is:

1. An audio encoding apparatus comprising an input for receiving samples of audio data; an output for encoded audio data; implementing means configured to implement selectably any one of a plurality of encoding functions, wherein each of said encoding functions implements a respective part of a single audio encoder when applied to said audio samples; causing means configured to cause at least some of said encoding functions to be applied in use to said audio data to produce said encoded audio data; and an adaptation controller arranged to adjust at least one of said implementing means and said causing means in response to at least one feedback input received by said adaptation controller during operation of said audio encoder to change at least one of said at least some encoding functions, and wherein said adaptation controller is configured to change at least one of said at least some encoding functions during production of encoded audio data by said audio encoder and said causing means comprising an operation scheduler arranged to control the order in which at least some of the encoding functions are applied to said audio data.

2. An audio encoding apparatus as claimed in claim 1, wherein said adaptation controller is responsive to said at least one feedback input to cause said implementing means to implement, in respect of at least one of said encoding functions, a selected one or more of a plurality of respective encoding algorithms.

3. An audio encoding apparatus as claimed in claim 1, wherein said adaptation controller is responsive to said at least one feedback input to cause said implementing means to adapt, in respect of at least one of said encoding functions, an implementation of a selected one or more of a plurality of respective encoding algorithms.

4. An audio encoding apparatus as claimed in claim 3, wherein the adaptation controller is arranged to provide the implementing means with at least one parameter value for adapting the implementation of the, or each, respective encoding algorithm.

5. An audio encoding apparatus as claimed in claim 1, wherein the implementation means is co-operable with means for storing a plurality of encoding algorithms that are selectable by said adaptation controller, said implementation means being arranged to use, in the implementation of said encoding functions, one or more stored encoding algorithms selected by said adaptation controller.

6. An audio encoding apparatus as claimed in claim 5, wherein at least some of said encoding algorithms are associated with respective performance data being indicative of at least one aspect of the performance of said encoding apparatus when implementing the respective encoding algorithm.

7. An audio encoding apparatus as claimed in claim 1, wherein said operation scheduler is arranged to select the order in which said at least some encoding functions are applied to said audio data in response to instructions received by said operation scheduler from said adaptation controller.

8. An audio encoding apparatus as claimed in claim 7, wherein said adaptation controller is arranged to communicate an operation schedule to said operation scheduler, said operation scheduler causing said at least some encoding functions to be applied in accordance with said operation schedule.

9. An audio encoding apparatus as claimed in claim 1, wherein said adaptation controller is responsive to said at least one feedback input to cause said operation scheduler to change the order in which said at least some encoding functions are applied to said audio data.

10. An audio encoding apparatus as claimed in claim 1, wherein said at least one feedback input includes signals received by said adaptation controller from said implementing means in respect of one or more of said encoding functions, the adaptation controller being arranged to determine using data included in said signals how to adjust at least one of said implementing means and said causing means.

11. An audio encoding apparatus as claimed in claim 10, wherein said data included in said signals is indicative of the status, performance and/or operation of the respective encoding function.

12. An audio encoding apparatus as claimed in claim 1, wherein said at least one feedback input includes signals received by said adaptation controller from said operation scheduler in respect of one or more aspects of the operation of the encoding apparatus, the adaptation controller being arranged to determine using data included in said signals how to adjust at least one of said implementing means and said causing means.

13. An audio encoding apparatus as claimed in claim 12, wherein said data received from said operations scheduler is indicative of the frequency of use of at least one of said encoding functions.

14. An audio encoding apparatus as claimed in claim 1, wherein said at least one feedback input includes signals received by said adaptation controller from said operation scheduler in respect of one or more characteristics of the audio data received by the encoding apparatus in use, the adaptation controller being arranged to determine using data included in said signals how to adjust at least one of said implementing means and said causing means.

15. An audio encoding apparatus as claimed in claim 1, wherein said at least one feedback input includes signals received by said adaptation controller from externally of the encoding apparatus, the adaptation controller being arranged to determine using data included in said signals how to adjust at least one of said implementing means and said causing means.

16. An audio encoding apparatus as claimed in claim 15, wherein said data included in signals received from externally of the encoding apparatus are indicative of at least one aspect of the performance or status of an external system with which said audio encoding apparatus is associated.

17. An audio encoding apparatus as claimed in claim 2, wherein at least some of said encoding algorithms are associated with respective performance data being indicative of at least one aspect of the performance of said encoding apparatus when implementing the respective encoding algorithm, and wherein, in determining how to adjust at least one of said implementing means and said causing means, said adaptation controller is arranged to evaluate the respective performance data associated with the or each respective selectable encoding algorithm.

18. An audio encoding apparatus as claimed in claim 8, wherein at least some of said encoding algorithms are associated with respective performance data being indicative of at least one aspect of the performance of said encoding apparatus when implementing the respective encoding algorithm, and wherein, in determining said operation schedule, said adaptation controller is arranged to evaluate the respective performance data associated with the or each respective selectable encoding algorithm.

19. An audio encoding apparatus as claimed in claim 17, wherein said adaptation controller is arranged to define an objective function from the respective performance data associated with the respective selected and/or selectable encoding algorithms, and to apply a mathematical programming method to obtain an optimum solution to the objective function.

20. An audio encoding apparatus as claimed in claim 1, wherein at least one of said encoding algorithms is arranged to adapt its operation in response to one or more characteristics of said audio data.

21. An encoding apparatus as claimed in claim 1, arranged to receive data from a decoder, said data being indicative of the configuration of the decoder, and wherein said adaptation controller is arranged to cause at least one of said implementing means and said causing means to be adjusted in accordance with the configuration data received from the decoder.

22. An audio encoding apparatus as claimed in claim 1, wherein said encoding functions comprise at least one of an audio data partitioner, a forward transformer, a feature extractor, an inter-channel coder, an intra-channel coder, an error control coder and a transmission frame generator.

23. An audio decoding apparatus comprising an input for receiving samples of encoded audio data; an output for decoded audio data; implementing means configured to implement selectively any one of a plurality of decoding functions wherein each of said decoding functions implements a respective part of a single audio decoder when applied to said encoded audio data; causing means configured to cause at least some of said decoding functions to be applied in use to said encoded audio data to produce said decoded audio data; and an adaptation controller arranged to adjust at least one of said implementing means and said causing means in response to at least one feedback input received by said adaptation controller during operation of said audio decoder to change at least one of said at least some decoding functions, and wherein said adaptation controller is configured to change at least one of said at least some decoding functions during production of decoded audio data by said audio decoder, and causing means comprising an operation scheduler arranged to control the order in which at least some of the decoding functions are applied during production of said decoded audio data.

24. A decoding apparatus as claimed in claim 23, arranged to receive data from an encoding apparatus, said data being indicative of the configuration of the encoding apparatus, and wherein said adaptation controller is arranged to cause at least one of said implementing means and said causing means to be adjusted in accordance with the configuration data received from the encoding apparatus.

25. A decoding apparatus as claimed in claim 23, arranged to send data to an encoding apparatus, said data being indicative of the configuration of the decoder, and to receive an acknowledgement from the encoding apparatus, and wherein said adaptation controller is arranged to delay said adjusting of at least one of said implementing means and said causing means until said acknowledgement is received.

26. A method of audio encoding, the method comprising receiving an input comprising samples of audio data; applying at least some of a plurality of selectable encoding functions to said audio data samples to produce encoded audio data wherein each of said encoding functions implements a respective part of a single audio encoder when applied to said audio samples; and changing, during production of encoded audio data by said audio encoder, the implementation of said at least some encoding functions in response to one or more feedback inputs received during operation of said audio encoder, wherein changing the implementation of said at least some encoding functions comprises changing an order in which at least some of the encoding functions are applied to said audio data samples.

27. A method of audio decoding, the method comprising receiving an input comprising samples of encoded audio data; applying at least some of a plurality of selectable decoding functions to said encoded audio data samples to produce decoded audio data, wherein each of said decoding functions implements a respective part of a single audio decoder when applied to said encoded audio data; and changing, during production of said decoded audio data by said audio decoder, the implementation of said at least some decoding functions in response to one or more feedback inputs received during operation of said audio decoder, wherein changing the implementation of said at least some encoding functions comprises changing an order in which at least some of the decoding functions are applied to said encoded audio data samples.

* * * * *